United States Patent [19]

Chung

[11] 4,082,180
[45] Apr. 4, 1978

[54] MOTORIZED CONVEYOR PULLEY

[75] Inventor: Jackson Chung, Mishawaka, Ind.

[73] Assignee: Reliance Electric Company, Mishawaka, Ind.

[21] Appl. No.: 710,683

[22] Filed: Aug. 2, 1976

[51] Int. Cl.² .......................................... B65G 23/00
[52] U.S. Cl. ................................. 198/835; 198/788
[58] Field of Search .............. 198/835, 788, 832, 854; 310/115, 116, 83; 193/37

[56] References Cited

U.S. PATENT DOCUMENTS

| | | | |
|---|---|---|---|
| 1,825,119 | 9/1931 | Mug | 198/788 |
| 2,439,520 | 4/1948 | Miller | 74/421 |
| 2,736,205 | 2/1956 | Dunne | 193/37 |
| 2,736,209 | 2/1956 | Christian | 198/854 X |
| 2,915,167 | 12/1959 | Berger | 198/788 |
| 2,949,048 | 8/1960 | Lewis | 74/802 |
| 2,997,608 | 8/1961 | Musser | 198/835 X |
| 3,122,945 | 3/1964 | Chung | 74/802 |
| 3,376,758 | 4/1968 | Mackay | 74/421 |

FOREIGN PATENT DOCUMENTS

| | | | |
|---|---|---|---|
| 680,982 | 2/1964 | Canada. | |
| 518,773 | 2/1931 | Germany | 198/788 |
| 878,086 | 9/1961 | United Kingdom | 310/116 |

OTHER PUBLICATIONS

Promotional Material - Self-Contained Packaged Power Terminal with the PPT.

*Primary Examiner*—Evon C. Blunk
*Assistant Examiner*—Douglas D. Watts
*Attorney, Agent, or Firm*—Marmaduke A. Hobbs

[57] ABSTRACT

A motorized conveyor pulley in which a rim and two end discs form a closed compartment and an electric motor and speed reducer are disposed in axial alignment with one another in the compartment. The motor is supported by a nonrotatable shaft extending through one end disc, and the speed reducer is connected to the motor by an input shaft and has an output shaft which is rigidly connected to the other end disc for rotating the pulley in response to the operation of the motor. A bearing is provided on said first shaft for permitting free rotation of the pulley with respect to the motor and the shaft, which are preferably prevented from rotating by a torque arm connected to the shaft. The air in the compartment is recirculated through the motor and along the inside surface of the pulley rim to cool the motor. The enclosed compartment is essentially sealed to minimize the entrance of dirt, excess moisture and other foreign materials thereinto, thus prolonging the life of the motor and speed reducer and minimizing the service requirements on the pulley assembly.

9 Claims, 3 Drawing Figures

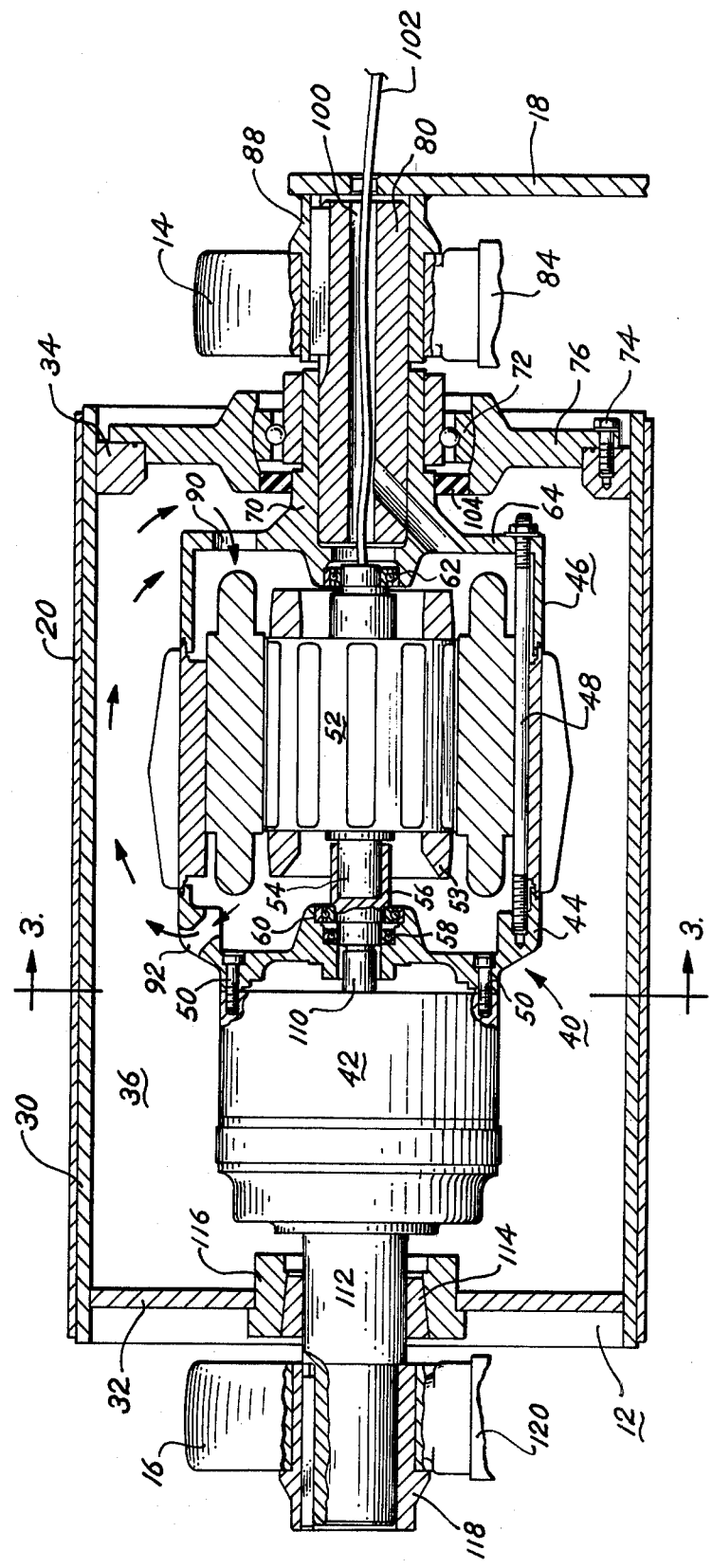

MOTORIZED CONVEYOR PULLEY

Conventional drives for relatively small conveyors, such as those of low horsepower used for package handling and for handling grain and other similar products in bulk, consist of a large number of separate components which must be assembled, either during fabrication of the drives or during the installation of the drives and pulleys, and hence are expensive and time consuming to install, service and repair. Further, the prior drives and pulleys for such conveyors have not been enclosed and have required frequent cleaning to remove the dirt, excess grease and other foreign material from the motor and pulley. The assembled components were also bulky, often making an installation of the conveyor drives in a limited or confined space a difficult operation. It is therefore one of the principal objects of the present invention to provide a combination conveyor pulley and drive which is fully enclosed and consists of a self-contained assembly which can be installed as a unit.

Another object of the invention is to provide a conveyor pulley and drive assembly in which one shaft of the pulley is a dead shaft through which the wiring and control leads enter the inner compartment of the pulley for connection with an electrical drive motor, and in which the other shaft is a live shaft connected directly to the pulley within the confines of the pulley rim.

Another object of the invention is to provide a conveyor pulley in which a drive motor and speed reducer are enclosed within the pulley rim and fully sealed therein, thus eliminating exposure of these components to dust, excess moisture, dirt and other foreign substances, and which is so constructed and designed that these components can easily be reached for servicing, repair and replacement.

Still another object is to provide a conveyor pulley and drive assembly of the aforesaid type which is compact and durable in construction, and reliable and efficient in performance, and which is virtually service-free for extended periods of time under normal operating conditions.

A further object of the invention is to provide a conveyor pulley drive assembly which can be readily adapted to a variety of different applications without any substantial changes in the construction and operation, and which is relatively simple in construction with no exposed belts or parts other than the shafts and pillow blocks at the two ends of the pulley.

Further objects and advantages will become apparent from the following description and accompanying drawings wherein:

FIG. 2 is a longitudinal cross sectional view of the pulley, pillow blocks and belt shown in FIG. 1, the section being taken on line 2 — 2 of the latter figure.

Figure 1:
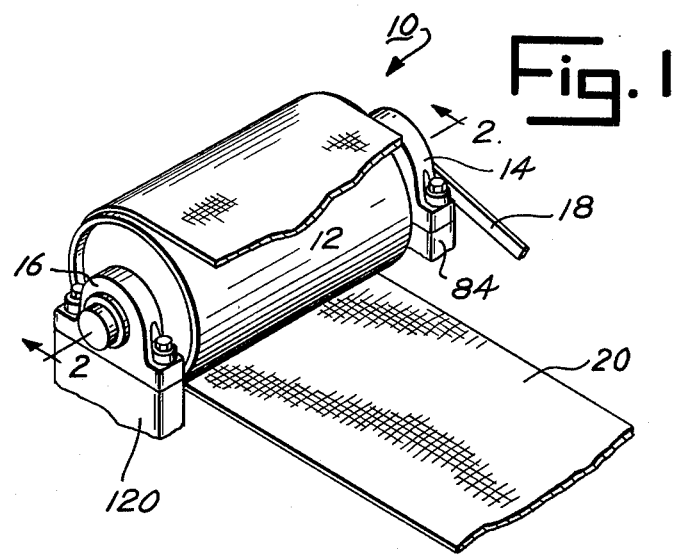
FIG. 1 is a perspective view of an installation in which the pulley is shown, having a belt trained thereon and being supported by pillow blocks on each end of the pulley.
Figure 3:
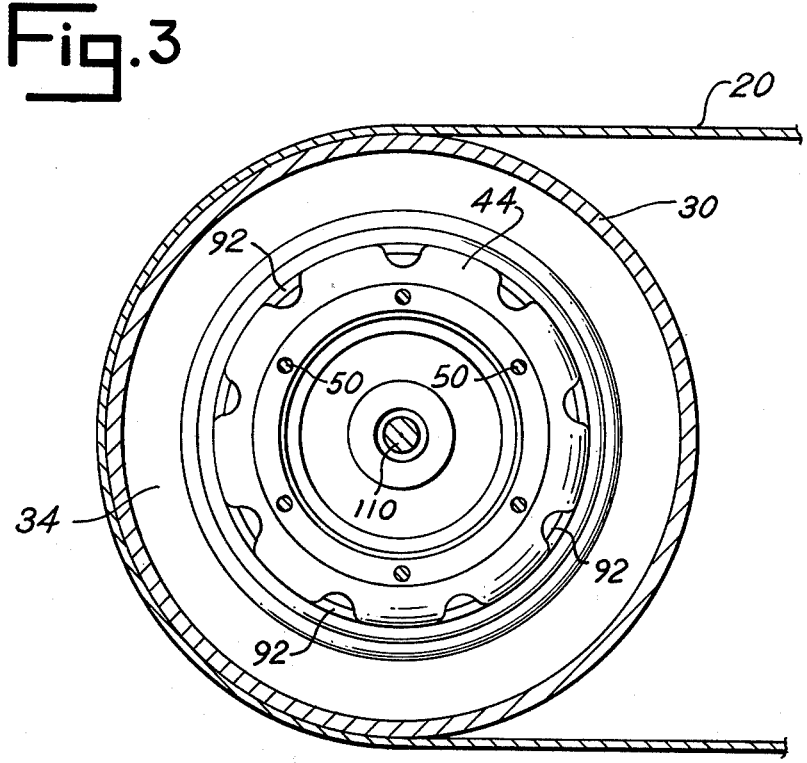
FIG. 3 is a transverse cross sectional view of the pulley assembly shown in the preceding figures, the section being taken on line 3 — 3 of FIG. 2.

Referring more specifically to the drawings, and to FIG. 1 in particular, numeral 10 indicates generally a conveyor belt assembly embodying the present invention and including a pulley 12, pillow blocks 14 and 16, a torque arm 18 and a conveyor belt 20. An idle or non-driven conveyor pulley is provided at the opposite end of the conveyor for the belt and is normally the same diameter as the driven pulley. The pulley and belt shown may be one section of a conveyor system in which a number of such pulley assemblies are used.

The pulley consists of a cylindrical rim 30 and end discs 32 and 34 preferably recessed in the respective ends of the rim. The two steel ends are secured, preferably by welding, to steel rim 30 to form a rigid structure, the rim and the two end discs defining compartment 36 in the pulley. Disposed in compartment 36 is an electric motor and gear reducer assembly indicated by numeral 40, the gear reducer 42 being connected by an adapter 44 to electric motor 46. The adapter is secured to the motor by a plurality of studs or bolts 48 spaced around the periphery of the motor and adapter, and the adapter is connected to the speed reducer by a plurality of bolts 50 extending through the adapter into the adjacent end of the reducer.

While the motor is shown in cross section, it is essentially a conventional electric motor having an armature 52 rotating with fan 53 and being supported on a shaft 54 which is connected to stud shaft 56 journaled in bearings 58 and 60 in adapter 44. The right hand end of shaft 54 is journaled in bearing 62 in the end of motor housing 64. The motor is supported on the right hand end by a stud shaft 70 connected integrally with the motor housing and being journaled in a flange bearing 72 bolted to end disc 34 by a plurality of bolts 74 disposed around the periphery of flange 76 of the bearing. A nonrotatable or dead shaft 80 is disposed in and concentrically arranged with respect to stud shaft 70 and projects outwardly from the bearing, and, when the pulley is installed, the end of shaft 80 is journaled in pillow block 14 mounted on and secured to a base 84. Shaft 80 is rigidly secured to motor housing 64, and torque arm 18 is rigidly secured to a sleeve 88, which in turn is keyed to shaft 80 and prevents rotation of the shaft and motor housing 64. The torque arm forms a reaction member for the motor in driving speed reducer 42.

The motor and the speed reducer are sealed in compartment 36 in the pulley, and in order to prevent the motor from overheating, an air recirculating system is provided in the compartment wherein the air passes through openings 90 in the motor housing and 92 in the adapter to permit the air to circulate through the motor and thence outwardly to the inner surface of rim 30 where it is cooled before re-entering the motor through the holes. Normally a plurality of holes 90 and 92 are provided around the periphery of the motor housing and adapter, respectively, so that effective circulation of the air through the motor to the rim is constantly maintained, thus permitting the motor to operate for extended periods of time at an effective operating temperature. Shaft 80 has a central bore 100 through which the electrical wires for the motor pass. Thus, one of the advantages of the dead shaft supporting the motor housing is that it permits the electric wires to pass to and to be connected with the motor without any likelihood of the wires being damaged during the operation of the pulley assembly. A seal 104 is provided on the inside of bearing 72 to assist in sealing the compartment 36 from the atmosphere.

Reducer 42 is essentially a conventional concentric shaft gear reducer, which is radially balanced and has an input shaft 110 for driving a series of gears, which are connected to reducer output shaft 112, the output shaft being rigidly secured to end disc 32 by a tapered bushing 114 disposed in hub 116 rigidly secured to the end disc. Thus, the shaft 112, which is journaled in pillow block 16, drives pulley 12. The end of shaft 112 extends into a sleeve 118, which is secured to the inner race of a ball or roller bearing in the pillow block, thus permitting the shaft 112 and the pulley to rotate freely with respect to the pillow block, which in turn is mounted on and secured to base 120.

In the operation of the pulley and drive assembly previously described herein, with shafts 80 and 112 journaled in pillow blocks 14 and 16, respectively, operation of motor 46, which is held in nonrotating position in the pulley, drives input shaft 110 of speed reducer 42, which in turn drives output shaft 112 at a substantially reduced speed. Since shaft 112 is rotatable in pillow block 16 and is secured firmly to end disc 32, the pulley rotates with the shaft 112 and around stationary shaft 80 on flange bearing 72. Rotation of the pulley drives belt 20, and the reaction of the motor is transmitted through shaft 80 and sleeve 88 to torque arm 18, which is anchored on a suitable base or support (not shown). As the motor drives the speed reducer, the air is circulated through openings 90 and 92 in the end of the motor housing 64 and in the adapter 44, causing the air to flow inwardly through openings 90 and outwardly through holes 92 in the adapter, the air then passing outwardly from the motor to the inner surface of rim 30, where it is cooled before re-entering the motor through openings 90.

The two end discs are effectively sealed by metal-to-metal contact and seal 104, so that compartment 36 does not communicate with the atmosphere to any appreciable extent, and hence the motor and reducer parts are protected from dust, dirt, excessive moisture and other foreign materials. When inspection of or repairs on the motor and/or the speed reducer are required, the two components can be easily removed from the pulley by removing the screws 74 and pulling the motor and speed reducer outwardly through the circular opening in end disc 34 which, as seen in the drawings, is sufficiently large to permit the two components to pass easily therethrough. When the motor and speed reducer are to be removed, shaft 112 is released from hub 116 and tapered bushing 114 so that it will slide through the pulley as the motor and speed reducer are moved axially to the right as seen in FIG. 2. After the two components have been removed, they can be easily serviced apart from the pulley and replaced, or replacement components can easily be assembled in the pulley by slipping a new motor and speed reducer through the opening in end disc 34 into compartment 36, with shaft 112 being moved axially into place in hub 116 where it is secured by tapered bushing 114.

It is thus seen that the present pulley and drive assembly is simple in construction and operation and can be easily serviced and repaired if required. The service and replacement requirements are normally substantially reduced over those of the conventional pulley and drive assemblies, by the sealed, self-contained arrangement of the motor and speed reducer in compartment 36, wherein the circulating air does not communicate to any appreciable degree with the surrounding atmosphere. The present motorized conveyor pulley can be fully assembled in the manufacturing plant and thereafter readily installed in the field by merely placing the two end shafts in the pillow blocks mounted on suitable bases, and connecting the torque arm 18 to an anchor or support structure. When replacement of the assembly is required, one or both of the pillow blocks can be removed and the torque arm released, thus permitting the pulley to be removed by lifting it from the conveyor system.

While only one embodiment of the present motorized conveyor pulley has been described in detail herein, various changes and modifications may be made without departing from the scope of the invention.

I claim:

1. A motorized conveyor pulley comprising a rim and two end discs defining a closed compartment, said end discs being secured to said rim and having axially aligned openings therethrough, an electric motor and a speed reducer disposed in said compartment, an adapter connecting said motor and reducer and having air flow openings near the periphery thereof, said motor having an end wall disposed at the end opposite said adapter and having air flow openings therein, a nonrotatable shaft connected to said motor housing and extending outwardly through the opening in one of said end discs in axial alignment with said rim, a means connected to said shaft for preventing rotation thereof, a bearing disposed on said shaft and connected to said one end disc, means for continuously recirculating cooling air through said air flow openings between said motor and said compartment, said speed reducer having an input shaft means connected to said motor in said compartment and an output shaft means disposed in axial alignment with said first mentioned shaft and said rim and extending outwardly through the opening in the other of said end discs, and means rigidly connecting said output shaft means to said other end disc.

2. A motorized conveyor pulley as defined in claim 1 in which said adapter rigidly connects said electric motor and said speed reducer in end-to-end relation.

3. A motorized conveyor pulley as defined in claim 1 in which said nonrotatable shaft contains a center bore and electrical lines to said motor extend therethrough.

4. A motorized conveyor pulley as defined in claim 2 in which said nonrotatable shaft contains a center bore and the electrical lines to said motor extend therethrough.

5. A motorized conveyor pulley as defined in claim 1 in which the means connected to said shaft for preventing rotation thereof consists of a torque arm.

6. A motorized conveyor pulley as defined in claim 1 in which said first shaft and said output shaft means are connected to the respective end discs in sealing relationship for minimizing the inflow of atmospheric air into said compartment.

7. A motorized conveyor pulley as defined in claim 4 in which said first shaft and said output shaft means are connected to the respective end discs in sealing relationship for minimizing the inflow of atmospheric air into said compartment.

8. A motorized conveyor pulley as defined in claim 1 in which a support means is provided for the outer end of said nonrotating shaft and a bearing is provided for said rotating shaft externally of said pulley rim.

9. A motorized conveyor pulley as defined in claim 7 in which the end disc through which said output shaft means extends includes a hub and a bushing which secures said output shaft to said end disc and pulley rim for rotation in unison with one another.

* * * * *